UNITED STATES PATENT OFFICE.

ROBERT TENNENT SHAW, OF NEW YORK, N. Y.

IMPROVEMENT IN RETTING AND DISINTEGRATING FLAX, HEMP, &c.

Specification forming part of Letters Patent No. 41,352, dated January 19, 1864.

*To all whom it may concern:*

Be it known that I, ROBERT TENNENT SHAW, of the city and State of New York, have invented and made a certain new and useful Improvement in the Method of Separating the Fibers of Flax, Hemp, &c.; and I do hereby declare the following to be a full, clear, and exact description of my said method and the results effected thereby.

Flax and other vegetable material have heretofore been boiled and treated under heat and steam-pressure. It has also been fermented or retted at different temperatures and by various appliances.

The nature of my said invention consists in the following method of removing the glutinous and other material that causes the fibers to adhere to each other and to the stalk or straw by a boiling and fermenting or retting process combined. I take the vegetable material and boil it for six hours, more or less, according to the quality of said material. I prefer that this boiling operation be performed in a close vessel, so that a greater pressure than that of the atmosphere be attained, care being taken that the vegetable material is entirely immersed or kept down below the surface of the water. The vegetable material and water are then allowed to remain at a moderate temperature for about twelve hours, either in the boiling-vessel or in another, to which they may be removed or drawn off. Afterward the vegetable material is to be removed and dried, broken, cleaned, or otherwise prepared in any known manner for manufacturing purposes. The liquid from which the vegetable material is removed is to be allowed to remain about four days at a temperature of about 80° Fahrenheit, in which time it will ferment and form what I term "Shaw's extract de vlas." In the subsequent boiling operations I employ about one-third part of this extract de vlas and two-thirds water, in which the vegetable material is to be boiled as before, not, however, requiring so long a time, and when the liquid and vegetable material are allowed to remain after boiling for several hours — say about twelve hours — the said extract de vlas, being in a state of fermentation, produces a rapid and violent fermentation, that quickly destroys the gummy and other matter between the fibers, so that they will separate readily, both from the straw and from each other, and hence can be worked with great facility in the subsequent operations of removing the straw, combing, carding, spinning, &c. The vat containing said extract is to be replenished from time to time by the vat containing the fermenting vegetable material; or the said liquid in the fermenting-vessel may be employed with water in the aforesaid proportion in the boiling-vessel.

The effect of introducing the fermenting liquid into the water in which the vegetable material is to be boiled is to shorten and render much more perfect the retting operation, as said extract acts like yeast to start the fermentation in the fresh charge of fibrous material; and my process, being quick in its operation, avoids the risk that has heretofore existed of injuring the strength of the fiber by continuing the retting operation until a putrifactive fermentation ensues, or, like brewing beer, fomenting it before distilling.

What I claim, and desire to secure by Letters Patent, is—

The method herein specified of separating vegetable fiber by boiling in water with my said extract, for the purposes set forth.

In witness whereof I have hereunto set my signature this 31st day of December, 1863.

R. TENNENT SHAW.

Witnesses:
LEMUEL W. SERRELL,
THOS. GEO. HAROLD.